(12) United States Patent
Patterson

(10) Patent No.: US 6,282,876 B1
(45) Date of Patent: Sep. 4, 2001

(54) CROP DIVIDER FOR THE WHEEL OF AN AGRICULTURAL VEHICLE

(75) Inventor: Roger L. Patterson, Selkirk Manitoba (CA)

(73) Assignee: MacDon Industries Ltd., Winnipeg (CA)

( * ) Notice: Subject to any disclaimer, the term of this patent is extended or adjusted under 35 U.S.C. 154(b) by 0 days.

(21) Appl. No.: 09/383,082

(22) Filed: Aug. 25, 1999

Related U.S. Application Data
(60) Provisional application No. 60/098,303, filed on Aug. 27, 1998.

(51) Int. Cl.$^7$ ................................................. A01D 75/00
(52) U.S. Cl. ......................... 56/314; 56/119; 56/DIG. 24
(58) Field of Search ............................. 56/1, 314, 320.1, 56/119, 322, 317, 320, 319, 318, 399, 395, DIG. 5, DIG. 24; 172/833

(56) References Cited

U.S. PATENT DOCUMENTS

| | | | |
|---|---|---|---|
| 2,471,771 | * | 5/1949 | Parks et al. ............................. 56/119 |
| 2,703,956 | * | 3/1955 | Pool ....................................... 56/317 |
| 3,135,083 | * | 6/1964 | Czajkowski .............................. 56/28 |
| 3,214,894 | * | 11/1965 | Whitman ................................. 56/119 |
| 3,678,669 | * | 7/1972 | Czajkowski ............................. 56/314 |
| 4,301,644 | * | 11/1981 | Henderson ............................. 56/14.3 |
| 4,706,448 | * | 11/1987 | Gessel et al. ........................... 56/400 |
| 5,974,773 | * | 11/1999 | Rieck et al. ............................ 56/314 |

* cited by examiner

*Primary Examiner*—Robert E. Pezzuto
*Assistant Examiner*—Meredith C. Petravick
(74) *Attorney, Agent, or Firm*—Adrian D. Battison

(57) ABSTRACT

A crop divider is mounted in front of a ground wheel of an agricultural vehicle to divide the crop to pass on either side of the wheel. The divided includes two diverging divider sheets with two trailing side sheets. Each divider sheet carries a free rolling tine wheel parallel to the sheet and having a hub mounted on the divider sheet for rotation about an axis at a right angle to the sheet and a plurality of flexible tines extending outwardly from the hub for rotation with the hub about the axis. The tine wheel is thus mounted in front of the ground wheel and behind the divider sheet with the hub and top tines prevented from engaging the crop by the divider sheet and the tines extending downwardly below a bottom edge of the divider sheet for rolling on the ground and engaging the crop to comb the crop toward one side of the ground wheel. The tines are shaped such that each includes an outer portion which extends generally in an angular direction rearward of the direction of rotation and an inner portion which extends in a direction substantially at right angles to the outer portion in an angularly advanced direction.

15 Claims, 4 Drawing Sheets

CROP DIVIDER FOR THE WHEEL OF AN AGRICULTURAL VEHICLE

This application claims priority to Provisional Application No. 60/098,303, filed Aug. 27, 1998.

The invention relates to a crop divider for mounting in front of a wheel of an agricultural vehicle when it is used to operate in standing crop, for example to apply agricultural chemicals. The agricultural vehicle as used herein is intended to include any vehicle with ground wheels arranged to travel across ground carrying a standing crop whether that vehicle is intended for towing a trailer or carries directly on the vehicle elements such as a sprayer for acting on the crop or the ground.

BACKGROUND OF INVENTION

One example of a vehicle of this type is the MacDon 9000 tractor which can carry the MacDon 625 Field sprayer mounted on the tractor which is commercially available and details are available from a brochure published by Westward Parts. Further details are shown in U.S. patent applications Ser. Nos. 08/904,148 and 09/020,855 filed Jul. 21 1997 and Feb. 9, 1998 the details of which are incorporated herein by reference. The corresponding Canadian Applications are 2,212,220 and 2,229,152.

The crop divider can also be used with other types of vehicles which are of the type used as a dedicated sprayer, for example the products available from John Deere, Willmar and Tyler, where a wheel must pass over standing crop to carry the sprayer and boom over the ground to effect a spraying action on the crop.

Many different designs of dividers have previously been used for dividing crop. They commonly depend on steel or plastic sheets (or bars) mounted on an angle to the direction of travel and diverging from a leading edge to push standing crop to the side. An example of this type is shown in the John Deere 4700 brochure on page 19.

These types of device are not effective on crop that is leaning substantially out of vertical or crop that is down and tangled. In addition, at higher speed the divider tends to push standing crop forward and down to a position where it is simply run over by the wheel. The disadvantages of these types of current dividers are sufficient that they are frequently not used even though 2 to 3% of the crop is typically run over and not harvested. This is a substantial loss that may be significantly reduced if an effective crop divider can be provided.

SUMMARY OF THE INVENTION

It is one object of the current invention to provide an improved divider for a wheel of an agricultural vehicle.

According to the invention, therefore, there is provided a crop divider for a ground wheel of an agricultural vehicle comprising:

at least one divider sheet having a bottom edge;

a mounting assembly for mounting the divider sheet in front of the ground wheel relative to a direction of forward movement of the ground wheel for engaging a crop growing on the ground in advance of the ground wheel and for directing the crop to one side of the ground wheel and with the bottom edge spaced from the ground;

at least one tine wheel having a hub mounted for rotation of the tine wheel about an axis thereof and a plurality of flexible tines extending outwardly from the hub for rotation with the hub about the axis;

the tine wheel being mounted in front of the ground wheel and behind the divider sheet with the hub prevented from engaging the crop by the divider sheet and the tines extending downwardly below a bottom edge of the divider sheet for engaging the crop adjacent the ground;

the tine wheel being arranged such that the tines thereof, as they pass rearwardly underneath the hub in a direction of rotation of the tine wheel about the axis, move generally along a line at an angle to the forward direction so as to comb the crop along the line toward one side of the ground wheel.

Preferably the tine wheel is driven by engagement of the tines with the crop and the ground.

Preferably the tines are sufficiently flexible so that the tine will deflect and not be damaged when crop does not move to the side.

Preferably the tine wheel stands in a substantially vertical plane containing said line.

Preferably the tine wheel rotates about the axis thereof which is at right angles to the plane.

Preferably the tine wheel is substantially parallel to the divider sheet.

Preferably the tines are shaped such that each includes an outer portion spaced outwardly from the hub for engaging the crop which extends generally in an angular direction rearward of the direction of rotation so as to be pulled from the crop as the tine wheel rotates without a tendency to wrap the crop around the tine wheel.

Preferably the tines are shaped such that each includes an inner portion which extends in a direction substantially at right angles to the outer portion in an angularly advanced direction.

Preferably there are two divider sheets and two tine wheels arranged such that the divider sheets meet at a leading edge standing in front of the ground wheel and arranged such that the tine wheels are inclined forwardly and inwardly so as to meet at a location behind the apex.

Preferably the tines of the tine wheels intersect behind the apex and in front of the hubs.

Preferably the mounting assembly is arranged to allow the divider to float up to avoid damage from obstacles.

Preferably there are provided side sheets that guide the crop material past the ground wheel.

Preferably the divider sheet has a top edge at a height at least at a top of the tines of the tine wheel.

In general, therefore, the divider assembly comprises of a divider frame mounted to the sprayer with a pivoting link mounted at the rear of the divider frame and supported at the front with a flexible chain. Mounted on the frame are sheets of steel or plastic to guide the crop material to the side and past the tire. Mounted to the front of the frame are two axles mounted at an angle to the direction of travel. Two tine wheels rotate on the axles behind the divider sheets. Mounted on the tine wheel hubs are spring tines that extend outward from the hub in a curved path such that as the tines can pull out of the crop with a minimum of friction. The tines extend below the divider sheets. The angle of the axle is such the tines will move to the rear and side as the tine wheel is rotated. A divider rod may be mounted in front of the divider sheets.

BRIEF DESCRIPTION OF THE DRAWINGS

One embodiment of the invention will now be described in conjunction with the accompanying drawings in which.

In the drawings like characters of reference indicate corresponding parts in the different figures.

DETAILED DESCRIPTION

Figure 1:
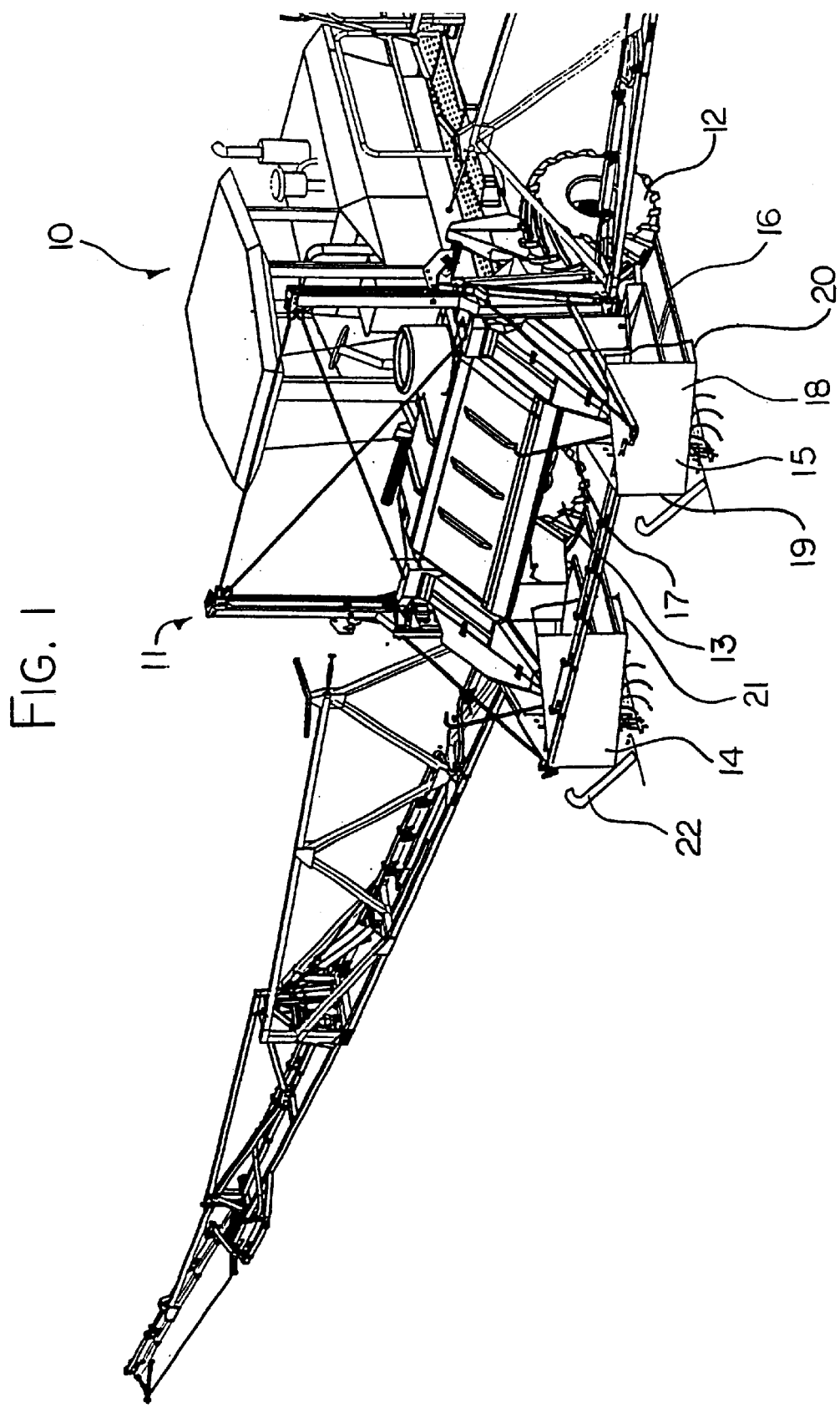
FIG. 1 us an isometric view showing a tractor and sprayer with the dividers installed.

In FIG. 1 is shown a tractor 10 which carries a sprayer assembly 11 supported on arms at a front of the tractor 10. The details of the tractor and the sprayer assembly are available to one skilled in the art since the machine is commercially available and is shown in brochures. Yet further the machine is described in detail in the aforementioned patent applications.

The problem of the ground wheels running over the growing crop is particularly problematic with the machine as shown since it uses relatively wide soft tires as opposed to the narrower high pressure tires of a conventional high clearance sprayers.

In order therefore to solve this problem, two crop dividers are mounted on the sprayer assembly each in front of a respective one of the ground wheels. Thus the tractor includes front ground wheels 12 and 13 and the crop dividers 14 and 15 are mounted each in advance of a respective one of the ground wheels.

Each crop divider comprises a frame generally indicated at 16 on which is mounted two front divider sheets 17 and 18 which converge to a vertical leading edge 19 in front of the wheel and positioned generally symmetrically on a center line of the wheel. Two additional side divider sheets 20 and 21 are also provided which extend along the side from a position adjacent to but spaced inwardly from the trailing edge of the front sheets to a position alongside the respective side edge of the wheel 12. The side edge sheets 20 and 21 are shown only partly for convenience of illustration.

Each crop divider has a divider rod 22 extending upwardly and forwardly for engaging into the crop in advance of the leading edge 19. The divider rod lies in the common vertical plane with the leading edge such that it initially separates standing crop so as to tend to push it to one side or the other.

The frame 16 includes two side rails 24 and 25 which extend generally horizontally from a position just in front of the wheel 12 to a position at the front of the divider. Each side rail is pivotally mounted on a support strut 26, 27 which depends downwardly from a suitable frame element on the sprayer structure 11. Thus the frame and the attached divider sheets can pivot upwardly and downwardly about a horizontal axis defined by a pair pivot pins 28 on the brackets 26, 27.

The frame is supported at its forward end by a suitable spring support structure including a cable schematically indicated at 30 which extends upwardly and rearwardly from a forward end of the divider to a suitable mounting bracket on the sprayer structure 11. The mounting arrangement including the cable 30 is arranged to provide a floating action with the use of suitable springs so that if the divider engages the ground it is lifted upwardly by the spring tension to clear any obstacle. The support system including the cable 30 also supports the weight of the forward end of the divider so that its weight is not applied directly to the ground through the tine wheels described hereinafter. The details of the mounting struts 26 and 27 and the cable tensioning system 30 are well apparent to one skilled in the art and therefore do not need to be described in detail herein.

Each divider sheet 17, 18 carries on its inside surface a respective one of a pair of tine wheels 32 and 33. Each tine wheel includes a hub 34 mounted on a shaft 35 carried in bearings 36 mounted on the inside surface of the respective one of the divider sheets 17, 18. The hub carries a plurality of radially outwardly extending tines 37. The tines of the tine wheel lie on a common plane with the hub 34 at right angles to the shaft 35 so that the tine wheel rotates in its common plane about the axis of the shaft 35. The tine wheel is thus preferably substantially parallel to the respective divider sheet 17, 18 and is spaced inwardly therefrom. The divider sheet has a top edge 38 which is at or slightly above the top of the tines of the tine wheel as passes over its uppermost point.

The divider sheet has a bottom edge 39 which is maintained spaced from the ground leaving a gap between the bottom edge and the ground of the order of 4 to 8 inches. The tines are arranged so that they project downwardly below the bottom edge 39 to a position closely adjacent to or in contact with the ground.

Figure 4:
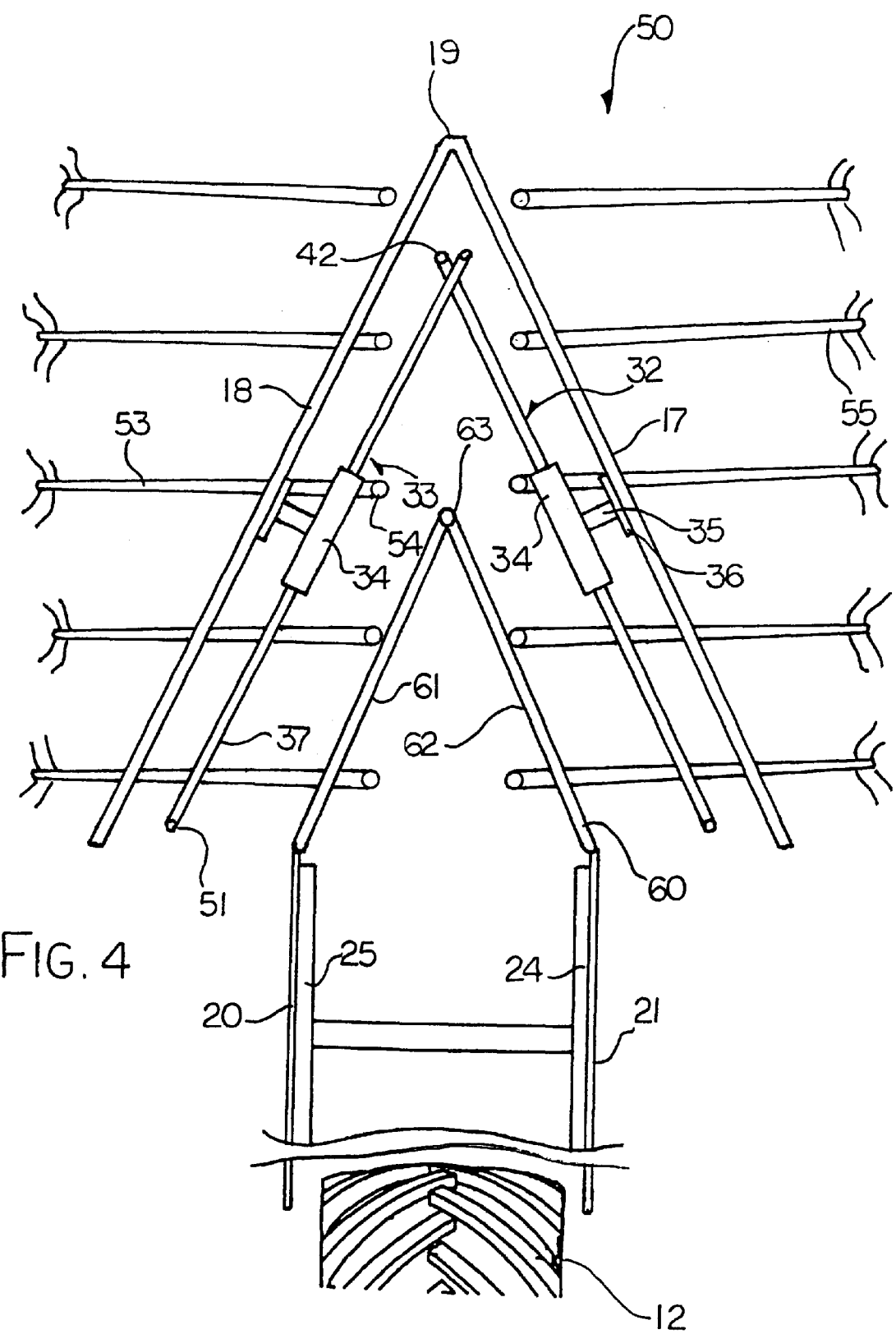
FIG. 4 is a plan view of the divider on a further enlarged scale showing the combing action of the tine wheels on the crop.

The tine wheels as best shown in FIG. 4 are thus inclined inwardly and forwardly toward the apex 19 and the tines have a length such that they intersect or overlap at the forward end in the horizontal plane containing the shaft 35. Thus the tines are one tine wheel engaged through the tines of the other tine wheel in this plane and at the position closely adjacent the ground the tines are immediately adjacent so that they meet or slightly spaced apart at the ground.

The tine wheels are not driven by any drive assembly but are instead rotated by their contact with the crop and/or with the ground.

Figure 2:
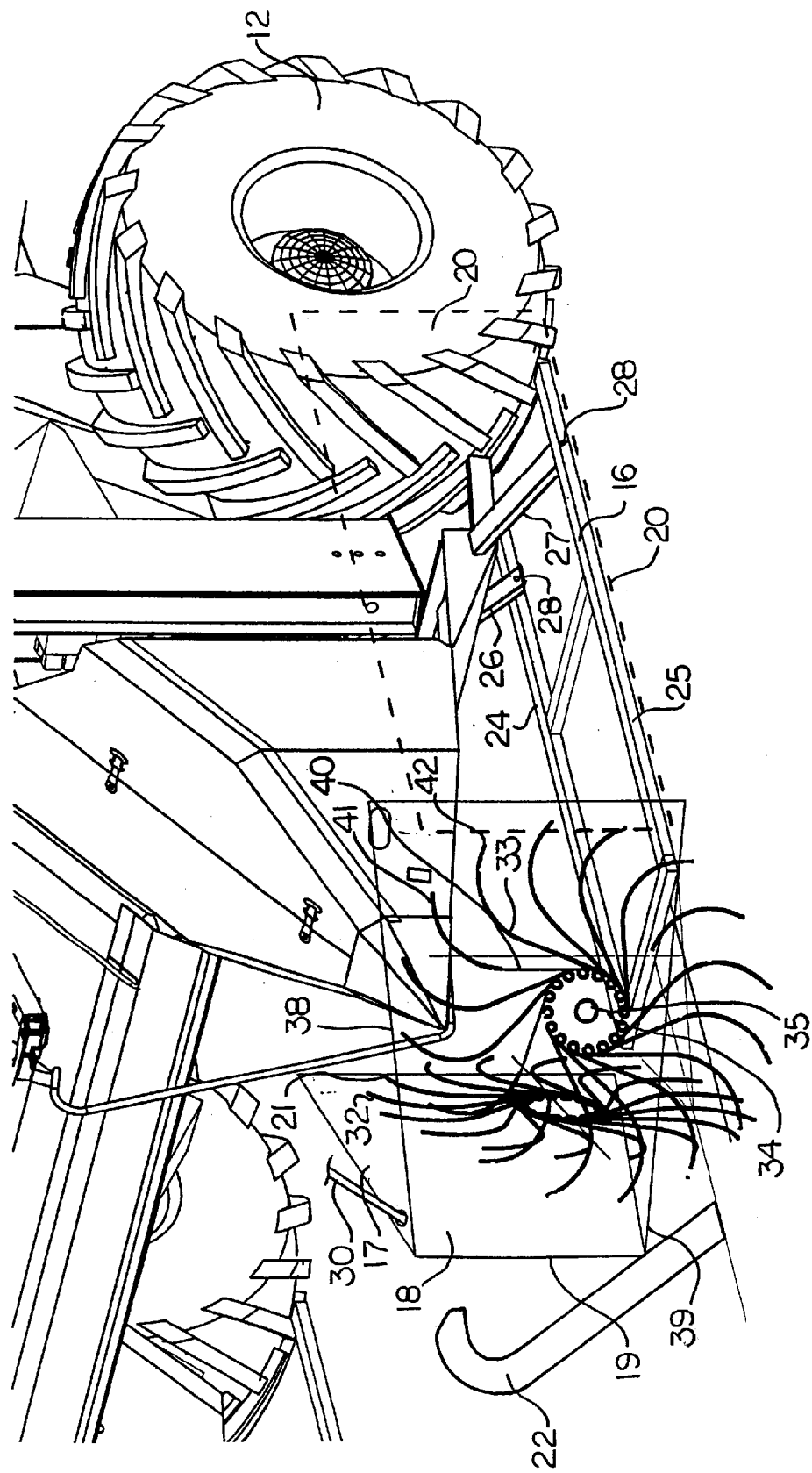
FIG. 2 is an enlarged view of the divider itself with the divider sheets are shown transparent to show the construction of the tine wheels.
Figure 3:
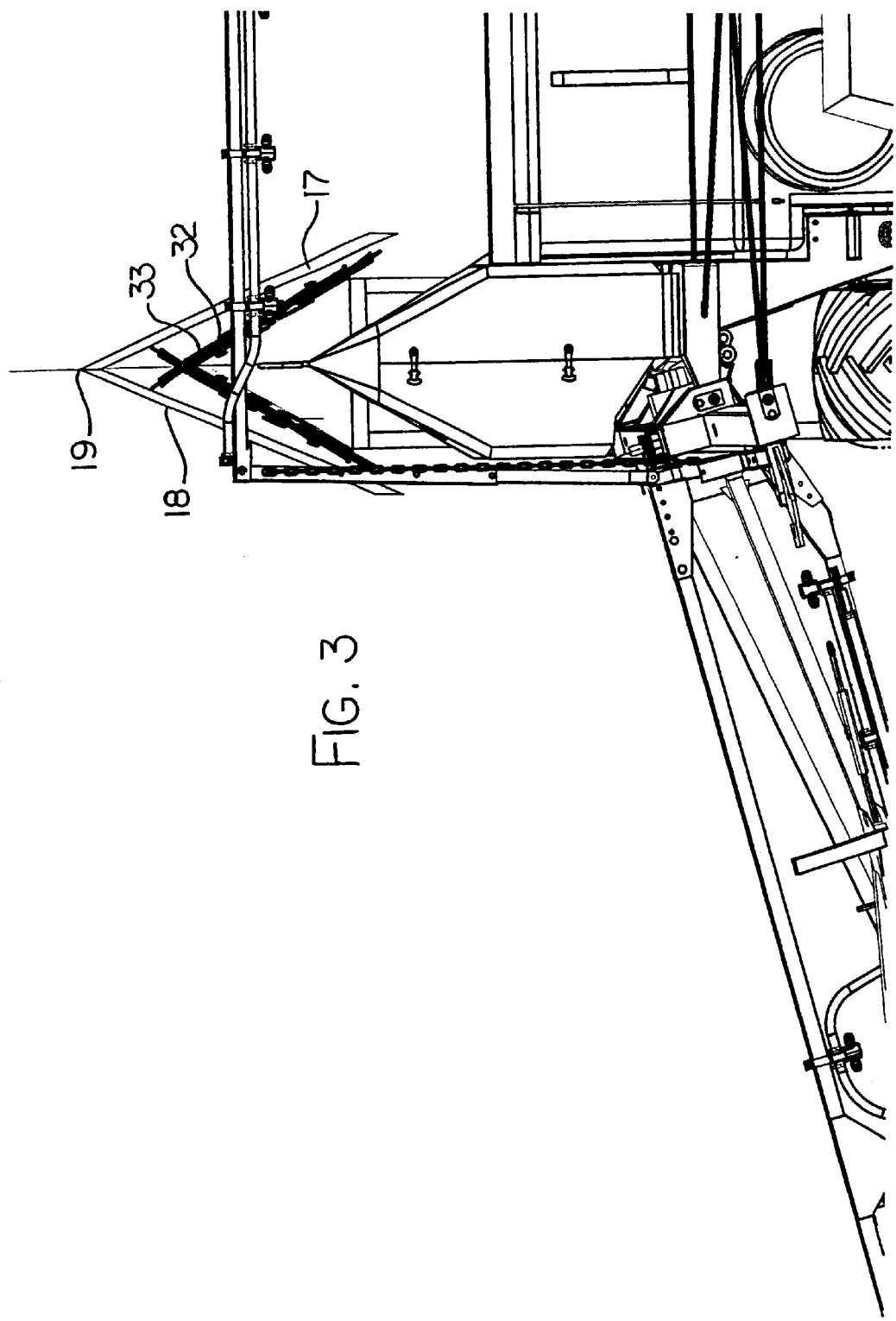
FIG. 3 is a plan view of the divider on the sprayer.

The tines are shaped as best shown in FIG. 2 so the first portion commences substantially tangential to the hub as indicated at 40 and a second portion curves outwardly from the first portion so as to be substantially at right angles to the first portion as indicated at 41. Thus the outer portion at the outermost tip 42 is close to tangential to the outer periphery of the tine wheel that is it lies substantially at right angles to a radius from the axis of the tine wheel. The outer portions 41 are bent so that they trail in the angular direction.

As best shown in FIG. 4, the side sheets 20 and 21 are spaced by the width of and supported on the frame beams 24 and 25 and thus are closer together than the trailing ends of the divider sheets 17 and 18. In addition, a divider rod assembly 60 is attached to the forward ends of the sheets 20 and 21 and includes two rods 61, 62 which converge forwardly and inwardly to an apex 63. The rods are arranged at the bottom edge of the side sheets 20 and 21 and thus lie approximately at the same height as the bottom edges of the sheets 17 and 18 that is about 6 inches from the ground. The apex 63 is forward of the rear end of the tines and the rods terminate rearwardly of the rear end of the tines. The side sheets 20 and 21 extend rearwardly from the rear ends of the rods without any space therebetween.

In operation the divider rod 22 parts a standing crop or push a tangled leaning crop down below the divider sheets. The tines of the tine wheel engage the crop material. As the sprayer moves forward, the crop will cause the tine wheels to rotate such that the lower tines substantially do not move forward with respect to the ground or crop material. The angle of the hub axle causes the tines to move to the side as it rotates and moves to the rear with respect to the sprayer. This lateral motion causes the tines to comb the crop to the side. The divider sheet prevents the crop from contacting the hub or the tines that are moving forward at the top of the tine wheel.

Thus as shown best in FIG. 4, crop which is lying or tangled as generally indicated at 50 passes underneath the divider sheets 17 and 18 and engages the tines as they are exposed underneath the divider sheets. The angle of the tine wheels thus acts to comb across the crop as the divider mover forwardly since the trailing end of the tine wheel as indicated at 51 is spaced from the center line 52 which contains the leading end of the tine wheel. This combing action across the crop by the individual tines pulls the crop outwardly from its tangled condition indicated at 50 so that the crop tends to lie outwardly as indicated at 53. The stalks 54 at their position of emergence from the ground thus remain underneath the divider but the heads 55 project outwardly to the sides of the divider and remain at a height sufficient for harvesting.

When the crop is released from the rear ends of the tines, any inward movement of the crop is halted by the rods 61 and 62 which thus direct the crop outwardly and hold the crop outward until it is engaged by the side sheets 20 and 21. The frame members 24 and 25 and additional side sheets 20 and 21 hold the crop material to the side until the sprayer tire has passed. Thus the heads of the crop will be pushed to the side and the base of the stalk will be run over by the tire. After the vehicle has passed the stalk will be leaning to the sides, but the majority of heads will still be located high enough that they can be harvested.

The stalks therefore may be crushed but the heads remain available for harvesting. When the crop is mature, the crushing of the stalks may cause fracturing but still the remainder of the stalk and the heads remain in position for harvesting. When the crop is less mature requiring a further growing period, the crushing of the stalks at the ground is less likely to cause damage so that the crop can continue to grow even though it may be distorted or creased at the ground level. The wide soft tires of the type of tractor shown can cause less damage to the crop at the ground when crushed.

The shape of the tines where the outermost edge trails rearwardly and lies nearly at a tangent as best shown in FIG. 2 allows the tines to be pulled out of the crop moving substantially along the length of the tine at that location so that there is less tendency to hook onto the crop and pull the crop around with the tine wheel to wrap around the hub.

The tine wheels are preferably not driven and are thus freely rotating so that they move at the required speed to follow with the movement of the crop. The engagement of the tines with the crop tends to pull the tine wheels around so that there is no relative movement between the tines and the crop in the forward direction. The intermeshing of the tines at the forward part can assist in driving both tine wheels in the event that one tine wheel becomes temporarily jammed since both tine wheels must rotate simultaneously. However the tine wheels can also be driven by a timed driving mechanism if required.

Since various modifications can be made in my invention as herein above described, and many apparently widely different embodiments of same made within the spirit and scope of the claims without departing from such spirit and scope, it is intended that all matter contained in the accompanying specification shall be interpreted as illustrative only and not in a limiting sense.

What is claimed is:

1. An agricultural vehicle including a ground wheel and a crop divider therefor, the crop divider comprising:

a divider sheet having a front edge, a trailing edge and a bottom edge;

a mounting assembly mounting the divider sheet on the vehicle with the front edge in front of the ground wheel relative to a direction of forward movement of the ground wheel for engaging a crop growing on the ground in advance of the ground wheel, the sheet being inclined rearwardly and to one side such that the trailing edge is arranged to one side of the ground wheel and so as to define a forwardly facing surface of the sheet for directing the crop to said one side of the ground wheel and the sheet being arranged with a rearwardly facing surface facing toward the wheel and with the bottom edge spaced from the ground;

the divider sheet having associated therewith a tine wheel having a hub for rotation of the tine wheel about an axis thereof and a plurality of flexible tines extending outwardly from the hub for rotation with the hub about the axis;

the tine wheel being mounted with the hub in front of the ground wheel and with the hub behind the rear surface of the divider sheet such that the hub is protected from engaging the crop by the divider sheet and the tines extending downwardly below the bottom edge of the divider sheet for engaging the crop adjacent the ground;

the tine wheel being mounted for rotation about an axis substantially at right angles to the sheet so that the tines rotate in a plane substantially parallel to the sheet such that the tines thereof, as they pass rearwardly underneath the hub in a direction of rotation of the tine wheel about the axis, move generally along a line at an angle to the forward direction so as to comb the crop along the line toward said one side of the ground wheel.

2. The vehicle according to claim 1 wherein the tine wheel is driven by engagement of the tines with the crop and the ground.

3. The vehicle according to claim 1 wherein the tines are sufficiently flexible so that the tine will deflect and not be damaged when crop does not move to the side.

4. The vehicle according to claim 1 wherein the tine wheel stands in a substantially vertical plane containing said line.

5. The vehicle according to claim 1 wherein the tines are shaped such that each includes an outer portion spaced outwardly from the hub for engaging the crop which extends generally in an angular direction rearward of the direction of rotation so as to be pulled from the crop as the tine wheel rotates without a tendency to wrap the crop around the tine wheel.

6. The vehicle according to claim 5 wherein the tines are shaped such that each includes an inner portion which extends in a direction substantially at right angles to the outer portion in an angularly advanced directions.

7. The vehicle according to claim 1 wherein there are provided at least one side sheet arranged rearwardly of the divider sheet and arranged to receive the crop from the divider sheet and to guide the crop material past the ground wheel.

8. An agricultural vehicle including a ground wheel and a crop divider therefor, the crop divider comprising:

two divider sheets each having a front edge, a trailing edge and a bottom edge;

a mounting assembly mounting the divider sheets on the vehicle with the front edge in front of the ground wheel relative to a direction of forward movement of the ground wheel for engaging a crop growing on the ground in advance of the ground wheel, each sheet being inclined rearwardly and to a respective side such that the trailing edge is arranged to a respective side of the ground wheel and so as to define a forwardly facing surface of the sheet for directing the crop to said one side of the ground wheel and each sheet being arranged with a rearwardly facing surface facing toward the wheel and with the bottom edge spaced from the ground;

each divider sheet having associated therewith a respective tine wheel having a hub for rotation of the tine wheel about an axis thereof and a plurality of flexible tines extending outwardly from the hub for rotation with the hub about the axis;

each tine wheel being mounted with the hub in front of the ground wheel and with the hub behind the rear surface of the respective divider sheet such that the hub is protected from engaging the crop by the divider sheet and the tines extend downwardly below the bottom edge of the divider sheet for engaging the crop adjacent the ground;

each tine wheel being mounted for rotation about a respective axis substantially at right angles to the respective sheet so that the tines rotate in a plane substantially parallel to the respective sheet such that the tines thereof, as they pass rearwardly underneath the hub in a direction of rotation of the tine wheel about the axis, move generally along a line at an angle to the forward direction so as to comb the crop along the line toward said respective side of the ground wheel, wherein the two divider sheets and the two tine wheels are arranged such that the divider sheets meet at a leading edge standing in front of the ground wheel and arranged such that the tine wheels are inclined forwardly and inwardly so as to meet at a location behind the apex.

9. The vehicle according to claim 8 wherein the tines of the tine wheels intersect behind the apex and in front of the hubs.

10. The vehicle according to claim 8 wherein each of the tine wheels is driven by engagement of the tines with the crop and the ground.

11. The vehicle according to claim 8 wherein the tines are sufficiently flexible so that the tine will deflect and not be damaged when crop does not move to the side.

12. The vehicle according to claim 8 wherein the tine wheel stands in a substantially vertical plane containing said line.

13. The vehicle according to claim 8 wherein the tines of each tine wheel are shaped such that each includes an outer portion spaced outwardly from the hub for engaging the crop which extends generally in an angular direction rearward of the direction of rotation so as to be pulled from the crop as the tine wheel rotates without a tendency to wrap the crop around the tine wheel.

14. The vehicle according to claim 13 wherein the tines are shaped such that each includes an inner portion which extends in a direction substantially at right angles to the outer portion in an angularly advanced directions.

15. The divider according to claim 8 wherein there are provided two side sheets each arranged rearwardly of a respective one of the divider sheets and arranged to receive the crop from the respective divider sheet and to guide the crop material past the ground wheel.

* * * * *